United States Patent
Choi et al.

(10) Patent No.: US 12,426,755 B2
(45) Date of Patent: Sep. 30, 2025

(54) ROBOT CLEANER AND METHOD FOR CONTROLLING THE SAME

(71) Applicant: LG ELECTRONICS INC., Seoul (KR)

(72) Inventors: Juno Choi, Seoul (KR); Janghun Cheong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 17/798,349

(22) PCT Filed: Sep. 1, 2020

(86) PCT No.: PCT/KR2020/011686
§ 371 (c)(1),
(2) Date: Aug. 9, 2022

(87) PCT Pub. No.: WO2021/182694
PCT Pub. Date: Sep. 16, 2021

(65) Prior Publication Data
US 2023/0104931 A1     Apr. 6, 2023

(30) Foreign Application Priority Data

Mar. 10, 2020     (KR) .................. 10-2020-0029502

(51) Int. Cl.
*A47L 9/28*     (2006.01)
*B25J 9/16*     (2006.01)
(Continued)

(52) U.S. Cl.
CPC .......... *A47L 9/2826* (2013.01); *A47L 9/2852* (2013.01); *B25J 9/1666* (2013.01); *B25J 9/1676* (2013.01);
(Continued)

(58) Field of Classification Search
None
See application file for complete search history.

(56) References Cited

U.S. PATENT DOCUMENTS 11,467,602 B2 * 10/2022 Passot .................. G05D 1/0221
2016/0101524 A1 * 4/2016 Noh ....................... B25J 9/1697
901/1
(Continued)

FOREIGN PATENT DOCUMENTS

EP     3308911     4/2018
EP     3310004     4/2018
(Continued)

OTHER PUBLICATIONS

Sun, Haiyin. (2019). <i>Basic Optical Engineering for Engineers and Scientists—1.9.2 Schematic Examples of an Image Formed by a Positive Lens .</i> (pp. 18-24). SPIE. Retrieved from <br>https://app.knovel.com/hotlink/pdf/id:kt012EFBS4/basic-optical-engineering/schematic-examples-an (Year: 2019).*

(Continued)

*Primary Examiner* — Amandeep Saini
*Assistant Examiner* — Caroline Tabancay Duffy
(74) *Attorney, Agent, or Firm* — KED & ASSOCIATES, LLP

(57) ABSTRACT

Disclosed is a method for controlling a robot cleaner including acquiring, by a camera, an image, irradiating, by a light source, light toward a location the same as a location where the acquired image is captured, receiving, by a sensor, the light irradiated from the light source and reflected on an object, processing an image received from the sensor to contain a distance value of an individual location, and supplementing the image received from the sensor with the image captured by the camera when a singularity is found, (Continued)

wherein distance values calculated in adjacent portions are discontinuous at the singularity.

14 Claims, 5 Drawing Sheets

(51) Int. Cl.
*B25J 11/00* (2006.01)
*B25J 19/02* (2006.01)
*G05D 1/00* (2006.01)
*H04N 23/12* (2023.01)
*H04N 23/57* (2023.01)

(52) U.S. Cl.
CPC ......... *B25J 11/0085* (2013.01); *B25J 19/023* (2013.01); *G05D 1/0214* (2013.01); *G05D 1/0221* (2013.01); *G05D 1/0238* (2013.01); *G05D 1/0242* (2013.01); *G05D 1/0246* (2013.01); *G05D 1/0251* (2013.01); *H04N 23/12* (2023.01); *H04N 23/57* (2023.01); *A47L 2201/04* (2013.01)

(56) References Cited

U.S. PATENT DOCUMENTS

| | | | |
|---|---|---|---|
| 2019/0184571 A1* | 6/2019 | Hou | ............................ A47L 1/00 |
| 2020/0019181 A1 | 1/2020 | Kim et al. | |
| 2021/0026369 A1* | 1/2021 | Izawa | .................. G05D 1/0251 |
| 2022/0044474 A1* | 2/2022 | Zhong | ..................... G06T 17/05 |

FOREIGN PATENT DOCUMENTS

| | | |
|---|---|---|
| JP | 2019-171017 | 10/2019 |
| KR | 10-1417315 | 7/2014 |
| KR | 10-2014-0119325 | 10/2014 |
| KR | 20170103556 A * | 9/2017 |
| KR | 10-2018-0112623 | 10/2018 |
| KR | 10-2019-0040746 | 4/2019 |
| WO | WO-2018186583 A1 * | 10/2018 ........... G05D 1/0214 |

OTHER PUBLICATIONS

International Search Report dated Dec. 15, 2020 issued in Application No. PCT/KR2020/011686.
European Search Report dated Jul. 24, 2022 issued in Application No. 20924565.3.

* cited by examiner

[FIG. 1]
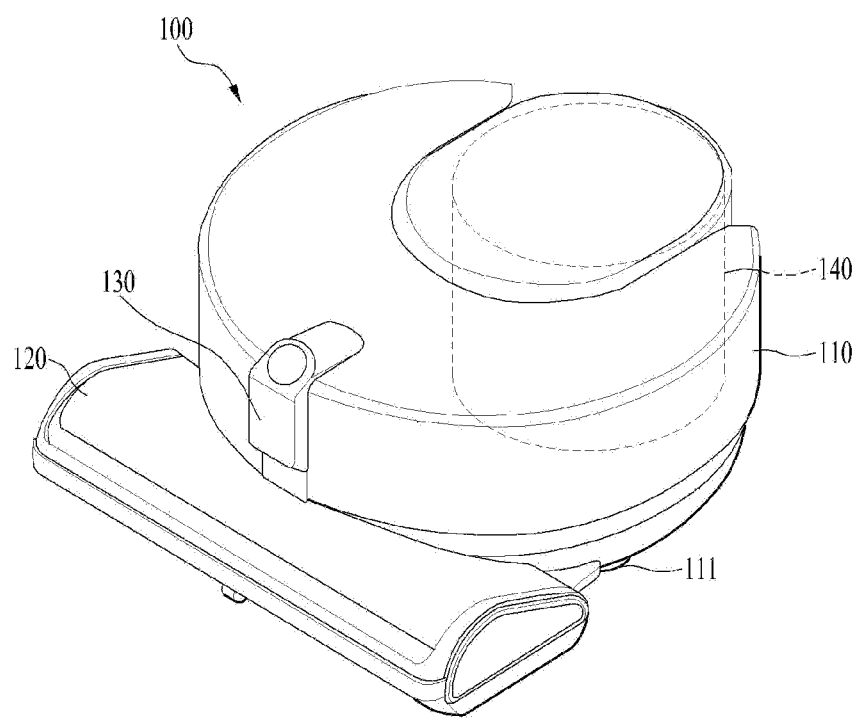

【FIG. 2】
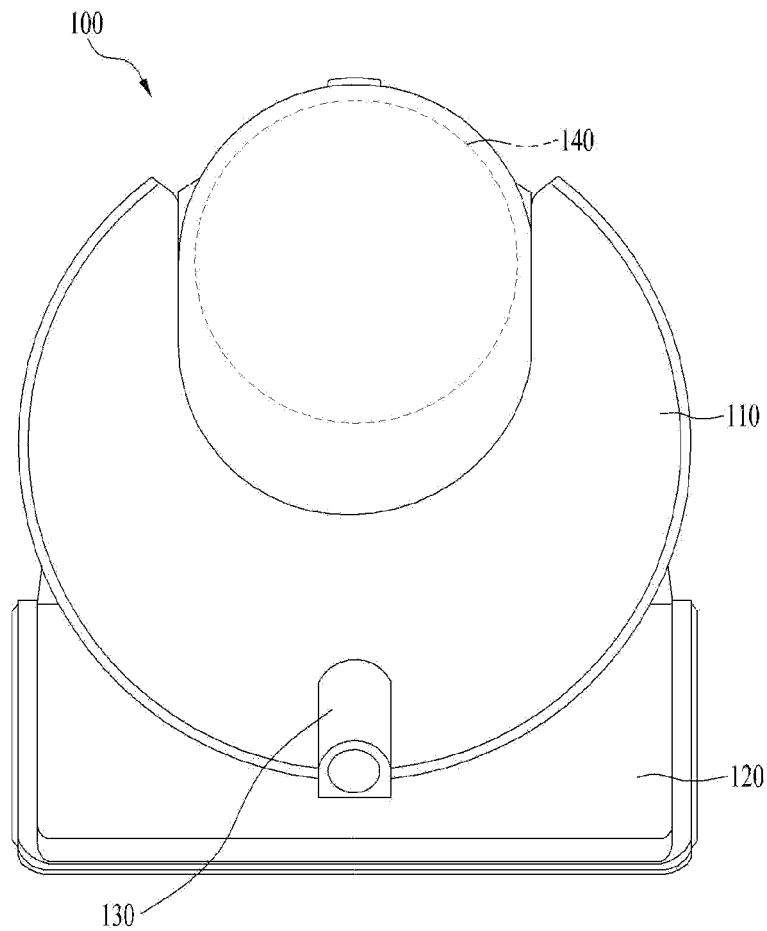
【FIG. 3】
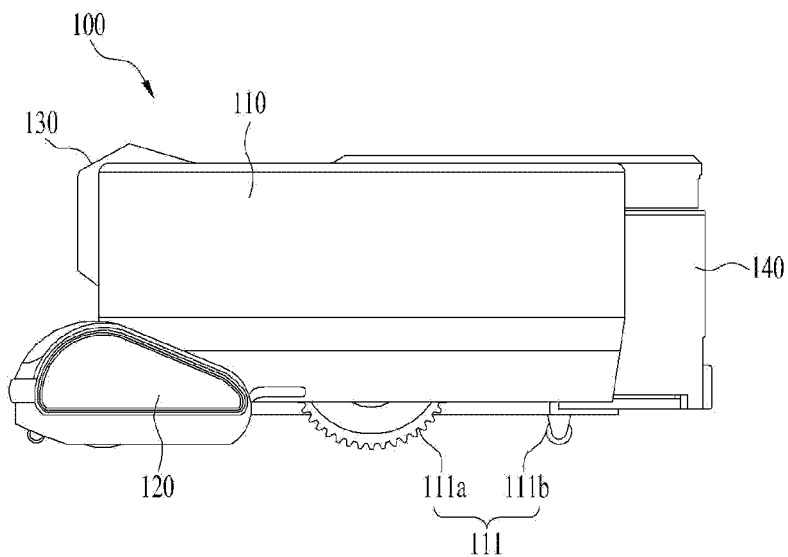

[FIG. 4]
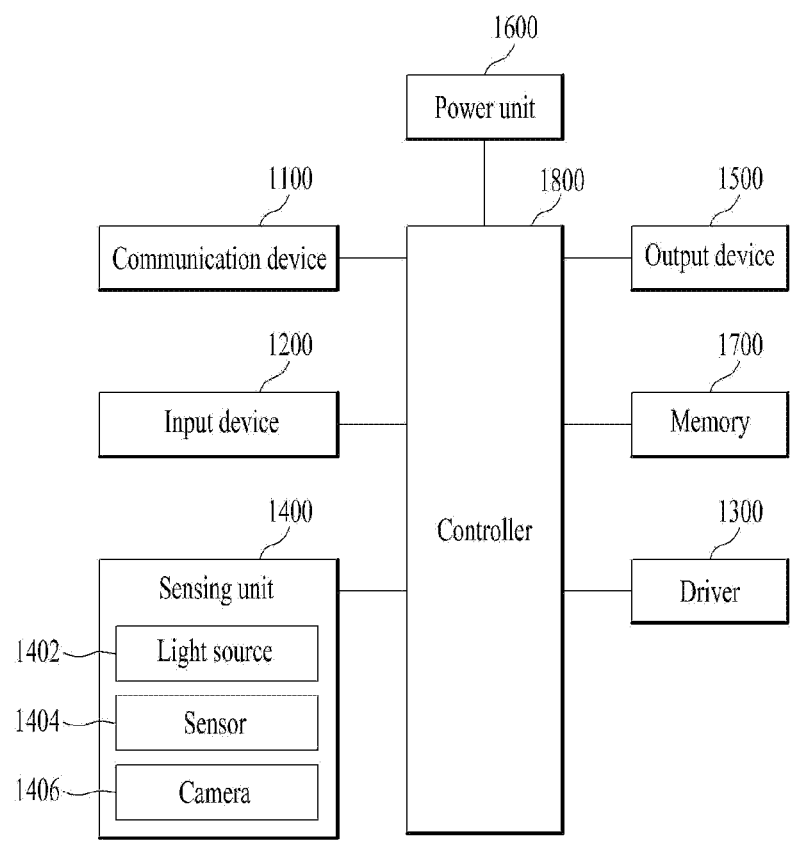

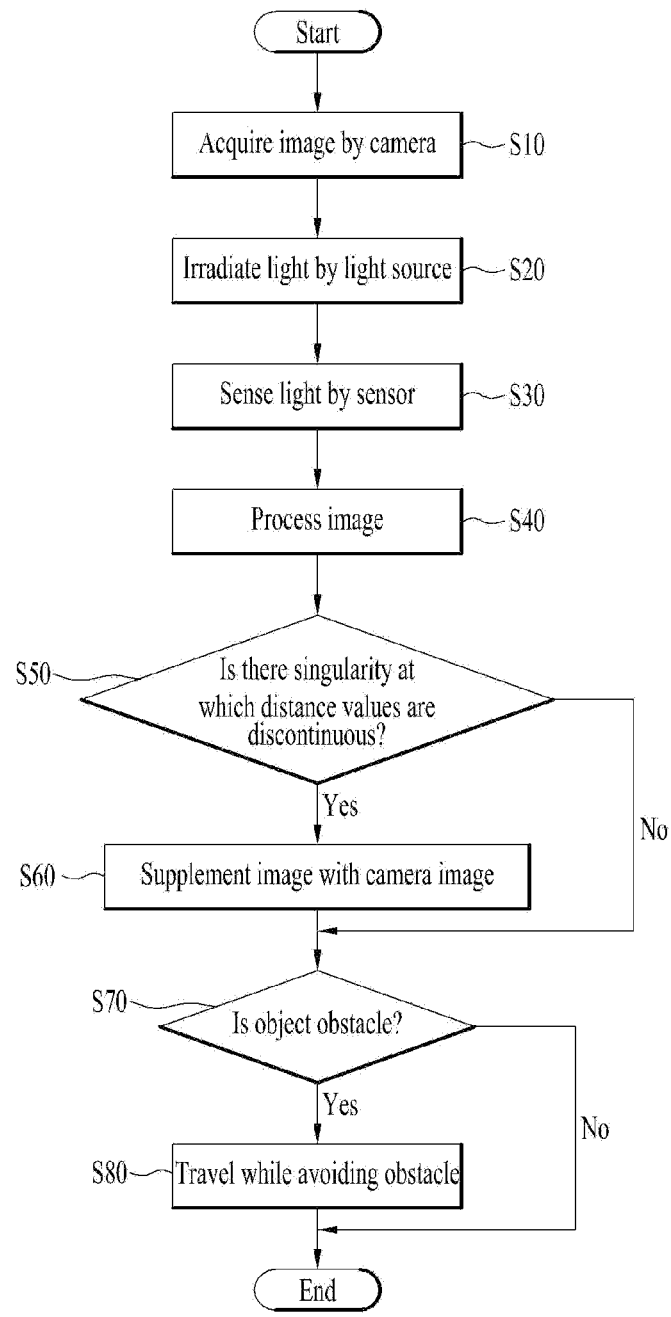

[FIG. 6A]
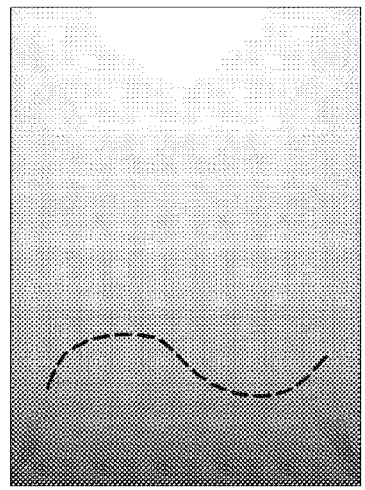
[FIG. 6B]
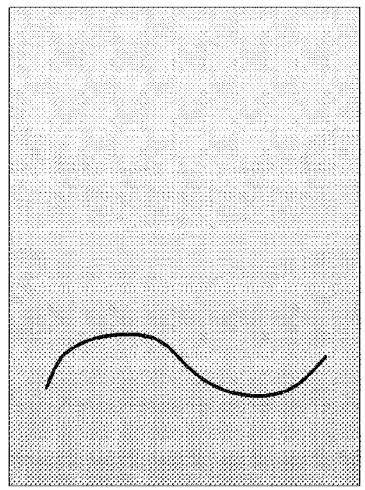
[FIG. 7A]
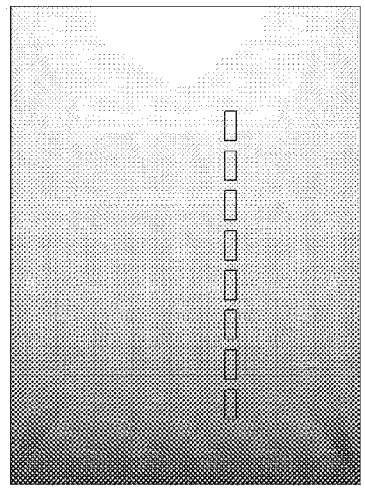
[FIG. 7B]
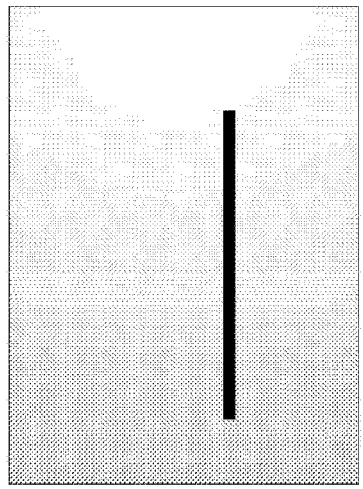

ROBOT CLEANER AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2020/011686, filed Sep. 1, 2020, which claims priority to Korean Patent Application No. 10-2020-0029502, filed Mar. 10, 2020, whose entire disclosures are hereby incorporated by reference.

TECHNICAL FIELD

The present disclosure relates to a robot cleaner and a method for controlling the same, and more particularly, to a robot cleaner and a method for controlling the same capable of accurately identifying an obstacle using a depth image and a 2-dimensional image and avoiding the obstacle.

BACKGROUND ART

In general, robots have been developed for industrial use and have been responsible for a part of factory automation. In recent years, fields to which robots are applied have been further expanded, so that medical robots, aerospace robots, and the like have been developed, and household robots that may be used in general homes are also being made.

A representative example of the household robot is a robot cleaner, which is a kind of home appliance that sucks surrounding dust or foreign matter to perform cleaning while traveling by itself in a certain region. Such a robot cleaner is generally equipped with a rechargeable battery and an obstacle sensor for avoiding an obstacle while traveling, so that the robot cleaner may perform the cleaning while traveling by itself.

Korean Patent Publication Application No. 10-2014-0011216, which is a prior art, discloses a technology of capturing a floor image and automatically sensing whether a material of a floor is a material similar to a carpet or the like or a material similar to a floor paper or the like. However, in the prior art, it is difficult to sense an obstacle that is difficult to be sensed through the image capturing, particularly, a thin obstacle such as a wire and the like.

DISCLOSURE OF INVENTION

Technical Problem

The present disclosure is to solve the above problems, and the present disclosure is to provide a robot cleaner and a method for controlling the same capable of accurately sensing an obstacle by supplementing an unclear portion in a captured depth image with a camera image.

In addition, the present disclosure is to provide a robot cleaner and a method for controlling the same capable of determining a thin obstacle such as a wire and avoiding the corresponding obstacle.

Solution to Problem

The present disclosure provides a robot cleaner and a method for controlling the same that may supplement a portion in a depth image in which it is difficult to identify whether an obstacle is recognized because of noise or diffused reflection/absorption resulted from a small size with color or brightness information of an IR image or an RGB image, thereby avoiding an obstacle.

The present disclosure acquires brightness or color information of some sensed points in the depth image from the IR image or the RGB image, then expands the sensed points through the brightness or color information of the acquired points, and then combines the expanded points with a slightly sensed depth image detection result to secure enough volume to be recognized as the obstacle.

The present disclosure provides a method for controlling a robot cleaner including acquiring, by a camera, an image, irradiating, by a light source, light toward a location the same as a location where the acquired image is captured, receiving, by a sensor, the light irradiated from the light source and reflected on an object, processing an image received from the sensor to contain a distance value of an individual location, and supplementing the image received from the sensor with the image captured by the camera when a singularity is found, wherein distance values calculated in adjacent portions are discontinuous at the singularity.

In addition, the present disclosure provides a robot cleaner including a camera for acquiring an image, a light source for irradiating light toward a location the same as a location where the acquired image is captured, a sensor for sensing that the light irradiated from the light source is reflected, and a controller that processes an image using the light sensed by the sensor to calculate a distance value of an individual location in the corresponding image, wherein the image is supplemented with the image acquired by the camera when a singularity is found, wherein distance values calculated in adjacent portions are discontinuous at the singularity.

Advantageous Effects of Invention

According to the present disclosure, the unclear portion in the captured depth image may be supplemented with the camera image, so that the obstacle may be accurately sensed. Therefore, a sensing accuracy of the obstacle may be improved.

In addition, according to the present disclosure, the thin obstacle such as the wire may be sensed, so that the robot cleaner may travel while avoiding the corresponding obstacle, thereby preventing a damage of the robot cleaner.

BRIEF DESCRIPTION OF DRAWINGS

FIG. 1 is a perspective view of a robot cleaner according to an embodiment.
FIG. 2 is a plan view of FIG. 1.
FIG. 3 is a side view of FIG. 1.
FIG. 4 is a block diagram showing components of a robot cleaner according to an embodiment.
FIG. 5 is a control flowchart according to an embodiment.
FIGS. 6A and 6B are views comparing images of a sensor and a camera captured a wire.
FIGS. 7A and 7B are views comparing images of a sensor and a camera captured a thin rod.

MODE FOR THE INVENTION

Hereinafter, a preferred embodiment according to the present disclosure that may specifically realize the above object will be described with reference to the accompanying drawings.

In such process, a size or a shape of a component shown in the drawings may be exaggerated for clarity and convenience of description. Moreover, terms specifically defined in consideration of the composition and operation according to the present disclosure may vary depending on the intention or custom of the user or operator. Definitions of such terms should be made based on the contents throughout this specification.

Referring to FIGS. 1 to 3, a robot cleaner 100 performs a function of cleaning a floor while traveling by itself in a certain region. The cleaning of the floor referred herein includes sucking dust (including foreign matter) from the floor or mopping the floor.

The robot cleaner 100 includes a cleaner body 110, a suction unit 120, a sensing unit 130, and a dust collection vessel 140.

The cleaner body 110 includes a controller (not shown) for controlling the robot cleaner 100 and a wheel unit 111 for the traveling of the robot cleaner 100. The robot cleaner 100 may be moved back and forth and left and right, or rotated by the wheel unit 111.

The wheel unit 111 includes main wheels 111a and sub-wheels 111b.

The main wheels 111a may be respectively arranged on both sides of the cleaner body 110 to rotate in one direction or the other direction in response to a control signal of the controller. The main wheels 111a may be driven independently of each other. For example, the main wheels 111a may be respectively driven by different motors.

The sub-wheels 111b support the cleaner body 110 together with the main wheels 111a, and assist the traveling of the robot cleaner 100 by the main wheels 111a. Such sub-wheels 111b may also be arranged in the suction unit 120 to be described later.

As described above, as the controller controls the driving of the wheel unit 111, the robot cleaner 100 autonomously travels on the floor.

In one example, the cleaner body 110 is equipped with a battery (not shown) that supplies power to the robot cleaner 100. The battery may be rechargeable and detachable from a bottom face of the cleaner body 110.

The suction unit 120 is disposed to protrude from one side of the cleaner body 110 and sucks air containing dust. The one side may be a side on which the cleaner body 110 travels in a forward direction F, that is, a front side of the cleaner body 110.

The suction unit 120 may be detachably coupled to the cleaner body 110. When the suction unit 120 is separated from the cleaner body 110, a mop module (not shown) may be detachably coupled to the cleaner body 110 by replacing the separated suction unit 120. Therefore, when a user wants to remove the dust from the floor, the user may mount the suction unit 120 on the cleaner body 110. In addition, when the user wants to mop the floor, the user may mount the mop module on the cleaner body 110.

The sensing unit 130 is disposed on the cleaner body 110. As shown, the sensing unit 130 may be disposed on the one side of the cleaner body 110 where the suction unit 120 is located, that is, the front side of the cleaner body 110.

The sensing unit 130 may be disposed to overlap the suction unit 120 in a vertical direction of the cleaner body 110. The sensing unit 130 is disposed above the suction unit 120 to sense an obstacle, a terrain object, or the like located in front of the robot cleaner such that the suction unit 120 located at the frontmost portion of the robot cleaner 100 does not collide with the obstacle.

The sensing unit 130 additionally performs another sensing function in addition to such sensing function. This will be described in detail later.

In FIG. 4 below, an embodiment associated with components of the robot cleaner 100 will be described.

The robot cleaner 100 according to an embodiment of the present disclosure may include at least one of a communication device 1100, an input device 1200, a driver 1300, a sensing unit 1400, an output device 1500, a power unit 1600, a memory 1700, and a controller 1800, or a combination thereof.

In this connection, the components shown in FIG. 4 are not essential, so that a robot cleaner having more or fewer components than that may be implemented. Hereinafter, each of the component will be described.

First, the power supply 1600 includes a battery that may be charged by an external commercial power source to supply power into the mobile robot.

The power supply 1600 may supply driving power to each of the components included in the mobile robot, thereby supplying operation power required for the mobile robot to travel or perform a specific function.

In this connection, the controller 1800 may sense a remaining power of the battery, and control the mobile robot to move to the charging device connected to the external commercial power source when the remaining power is insufficient, thereby charging the battery by receiving charging current from the charging device. The battery may be connected to a battery sensor, so that the remaining power of the battery and a state of charge may be transmitted to the controller 1800. The output device 1500 may display the remaining power of the battery on a screen by the controller.

The battery may be located at a lower portion of a center of the robot cleaner or may be located on one of left and right sides. In the latter case, the mobile robot may further include a counterweight to eliminate weight bias of the battery.

The controller 1800 plays a role of processing information based on an artificial intelligence technology, which may include at least one module that performs at least one of learning of information, inference of information, perception of information, and processing of natural language.

The controller 1800 may use a machine learning technology to perform at least one of the learning, the inference, and the processing of a vast amount of information (big data) such as information stored in the cleaner, surrounding environment information, and information stored in an external communicable storage. In addition, the controller 1800 may predict (or infer) one or more executable operations of the cleaner using the information learned using the machine learning technology, and control the cleaner such that an operation with the highest realization among the one or more predicted operations is executed.

The machine learning technology is a technology, based on at least one algorithm, of collecting and learning large-scale information, and determining and predicting information based on the learned information. The learning of the information is an operation of quantifying a relationship between information and information by identifying characteristics, rules, and criteria of determination of the information, and predicting new data using a quantified pattern.

An algorithm used in the machine learning technology may be an algorithm based on statistics, and may be, for example, a decision tree that uses a tree structure as a prediction model, an artificial neural network that mimics a structure and a function of a neural network of a living thing, genetic programming based on an evolution algorithm of the living thing, clustering that distributes observed examples into subsets called clusters, a Monte Carlo method that calculates function values with probability through randomly extracted random numbers, and the like.

As a field of the machine learning technology, a deep learning technology is a technology of performing at least one of the learning, the determination, and the processing of the information using an artificial neural network (deep neuron network, DNN) algorithm. The artificial neural network (DNN) may have a structure of connecting layers with each other and transferring data between the layers. Such deep learning technology may learn a vast amount of information through the artificial neural network (DNN) using a graphic processing unit (GPU) optimized for parallel computation.

The controller 1800 may use training data stored in an external server or in the memory, and may be equipped with a learning engine that detects features for recognizing a predetermined object. In this connection, the features for recognizing the object may include a size, a shape, a shadow, and the like of the object.

Specifically, in the controller 1800, when some of images acquired through a camera disposed in the cleaner are input into the learning engine, the learning engine may recognize at least one object or living thing contained in the input images.

As such, when applying the learning engine to the travel of the cleaner, the controller 1800 may recognize whether an obstacle, such as a chair leg, a fan, or a certain type of balcony gap, that interferes with the travel of the cleaner exists around the cleaner, so that efficiency and reliability of the cleaner travel may be increased.

In one example, the learning engine as described above may be mounted on the controller 1800 or on the external server. When the learning engine is mounted on the external server, the controller 1800 may control the communication device 1100 to transmit at least one image, which is an analysis target, to the external server.

The external server may recognize the at least one object or living thing contained in the corresponding image by inputting the image transmitted from the cleaner into the learning engine. In addition, the external server may transmit information associated with a recognition result back to the cleaner.

In this connection, the information associated with the recognition result may include information associated with the number of objects contained in the image, which is the analysis target, and a name of each object.

In one example, the driver 1300 includes a motor, and drives the motor to rotate the left and right main wheels in both directions, thereby turning or moving the body. The driver 1300 may allow the body of the mobile robot to move back and forth and left and right, to travel in a curved manner, or to turn in place.

In one example, the input device 1200 receives various control commands for the robot cleaner from the user. The input device 1200 may include at least one button. For example, the input device 1200 may include an identification button, a setting button, and the like. The identification button is a button for receiving a command for identifying sensing information, obstacle information, location information, and map information from the user. The setting button is a button for receiving a command for setting the information from the user.

In addition, the input device 1200 may include an input resetting button for cancelling a previous user input and receiving a user input again, a delete button for deleting a preset user input, a button for setting or changing an operating mode, a button for receiving a command to return to the charging device, and the like.

In addition, the input device 1200 may be installed on a top face of the mobile robot as a hard key, a soft key, a touch pad, and the like. In addition, the input device 1200 may have a form of a touch screen together with the output device 1500.

In one example, the output device 1500 may be installed on the top face of the mobile robot. In one example, an installation location or an installation form may become different. For example, the output device 1500 may display a battery state, a travel scheme, or the like on a screen.

In addition, the output device 1500 may output information of a status of an interior of the mobile robot detected by the sensing unit 1400, for example, current status of each component included in the mobile robot. In addition, the output device 1500 may display information of a status of an exterior detected by the sensing unit 1400, the obstacle information, the location information, the map information, and the like on the screen. The output device 1500 may be formed as one of a light emitting diode (LED), a liquid crystal display (LCD), a plasma display panel, and an organic light emitting diode (OLED).

The output device 1500 may further include sound output means for aurally outputting an operation process of the mobile robot performed by the controller 1800 or an operation result. For example, the output device 1500 may output a warning sound to the outside in response to a warning signal generated by the controller 1800.

In one example, the communication device 1100 is connected to a terminal device and/or another device located within a specific region (in this specification, the term "home appliance" will be used interchangeably) through one of wired, wireless, and satellite communication schemes to transmit and receive signals and data.

In one example, the memory 1700 stores a control program that controls or drives the robot cleaner and data generated therefrom. The memory 1700 may store audio information, image information, the obstacle information, the location information, the map information, and the like. In addition, the memory 1700 may store information associated with a travel pattern.

In one example, the sensing unit 1400 may include an external signal sensor and a cliff sensor.

The external signal sensor may sense an external signal of the mobile robot. The external signal sensor may be, for example, an infrared ray sensor, an ultrasonic sensor, a radio frequency sensor (RF sensor), and the like.

The mobile robot may identify a location and a direction of a charging device by receiving a guide signal generated by the charging device using the external signal sensor. In this connection, the charging device may transmit the guide signal indicating the direction and a distance such that the mobile robot is able to return. That is, the mobile robot may receive the signal transmitted from the charging device to determine the current location and set a moving direction to return to the charging device.

In one example, the cliff sensor may sense the obstacle on the floor that supports the body of the mobile robot mainly using various types of optical sensors.

That is, the cliff sensor is installed on a rear face of the mobile robot on the floor, but the cliff sensor is able to be installed at different locations based on a type of the mobile robot. The cliff sensor is for sensing the obstacle on the floor by being located on the rear face of the mobile robot. The cliff sensor may be an infrared ray sensor, an ultrasonic sensor, an RF sensor, a position sensitive detector (PSD) sensor, and the like equipped with a light emitter and a light receiver like the obstacle sensor.

As an example, one of the cliff sensors may be installed at a front portion of the mobile robot, and the other two cliff sensors may be installed at a relatively rear portion.

For example, the cliff sensor may be the PSD sensor, but may be composed of a plurality of different types of sensors.

The controller 1800 may measure an infrared ray angle between a light emission signal of an infrared ray emitted by the cliff sensor toward the ground and a reflection signal received by being reflected by the obstacle to sense the cliff and analyze a depth thereof.

In one example, the controller 1800 may determine whether to pass the cliff based on a ground condition of the cliff sensed using the cliff sensor, and may determine whether to pass the cliff based on the determination result. For example, the controller 1800 determines whether the cliff exists and the depth of the cliff using the cliff sensor, and then passes the cliff only when the reflection signal is sensed through the cliff sensor.

As another example, the controller 1800 may use the cliff sensor to determine a lifting phenomenon of the mobile robot.

The sensing unit 1400 may include a camera 1406. In this connection, the camera may mean a two-dimensional camera sensor. The camera 1406 is disposed on one face of the robot cleaner and acquires image information associated with a region around the body while moving.

Image data in a predetermined format is generated by converting an image input from an image sensor disposed in the camera 1406. The generated image data may be stored in the memory 1700.

In one example, the sensing unit 1400 may include a 3-dimensional depth camera (3D depth camera) that calculates a perspective distance between the robot cleaner and an imaging target. Specifically, the depth camera may capture a 2-dimensional image associated with the region around the body, and may generate a plurality of 3-dimensional coordinate information corresponding to the captured 2D image.

In an embodiment, the depth camera may include a light source 1402 that emits light and a sensor 1404 that receives the light from the light source 1402, and analyze an image received from the sensor 1404, thereby measuring a distance between the robot cleaner and the imaging target. Such 3D depth camera may be a 3D depth camera in a time of flight (TOF) scheme.

In another embodiment, the depth camera may include, together with the sensor 1404, the light source 1402 that irradiates an infrared ray pattern, that is, an infrared ray pattern emitter. The sensor 1404 may measure the distance between the robot cleaner and the imaging target by capturing a shape of the infrared ray pattern irradiated from the infrared ray pattern emitter projected onto the imaging target. Such 3D depth camera may be a 3D depth camera in an infrared (IR) scheme.

In another embodiment, the depth camera may be formed in a stereo vision scheme in which at least two cameras that acquire the existing 2-dimensional images are arranged and at least two images respectively acquired from the at least two cameras are combined with each other to generate the 3-dimensional coordinate information.

Specifically, the depth camera according to the embodiment may include a first pattern irradiating unit that irradiates light of a first pattern downward toward the front of the body, a second pattern irradiating unit that irradiates light of a second pattern upward toward the front of the body, and an image acquisition unit that acquires an image of the front of the body. Thus, the image acquisition unit may acquire an image of a region into which the light of the first pattern and the light of the second pattern are incident.

FIG. 5 is a control flowchart according to an embodiment. Further, FIG. 6 is a view comparing images of a sensor and a camera captured a wire. A process in which the robot cleaner recognizes an obstacle such as a wire in an embodiment will be described with reference to FIGS. 5 and 6.

While the robot cleaner travels, the camera 1406 may acquire the image of the region around the robot cleaner (S10). In this connection, the camera 1406 may provide an image of the robot cleaner viewed from the front.

The light source 1402 irradiates the light toward a location the same as a location captured by the camera 1406 (S20). In this connection, a plurality of the light sources 1402 may be arranged and the plurality of light sources may irradiate light with a time difference.

The light irradiated from the light source 1402 is received by the sensor 1404 after being reflected from the object (S30).

Then, information received from the sensor 1404 is processed to contain a distance value of an individual location through the controller 1800 (S40). That is, the information acquired from the sensor 1404 is information illustrating a two-dimensional plane. In this connection, the controller 1800 may calculate the distance value by calculating an arrival time point of the light received by the sensor 1404, and the like, and allow the information received from the sensor 1404 to contain the distance value of the corresponding location. In one example, the controller 1800 may calculate the distance value of each location of the image in various forms other than the above-described scheme.

Then, the controller 1800 determines whether there is a singularity at which distance values calculated in adjacent portions are discontinuous in the corresponding image (S50). In this connection, the adjacent portions may usually mean portions that are arranged close to each other enough for the distance values to form a single object. That is, when the image captured by the sensor 1404 is an image captured from a long distance, a distance between the adjacent portions may be set relatively small. On the other hand, when the captured image is an image captured at a close distance, the distance between the adjacent portions may be set relatively large.

In one example, whether there are a plurality of singularities instead of one singularity may also be detected. This is because it may be suspected that a plurality of obstacles are arranged fairly close to each other when there is one singularity, but it may be expected that there is noise or an error in the image acquired by processing the information captured by the sensor 1404 when there are the plurality of singularities.

For example, the image acquired by processing the information acquired by the sensor 1404 may be a screen shown in (a) in FIG. 6. When the wire is placed on the floor, a plurality of singularities are found in patches in the wire. In this case, it may be determined that there are a plurality of small obstacles based on the information acquired from the sensor 1404. In one example, because a size of each of a plurality of divided regions is small, the image acquired by processing the information acquired by the sensor 1404 may be ignored as information resulted from the error and it may be determined that there is no actual obstacle.

In order to solve such problem, in the present embodiment, the image acquired by processing the information acquired by the sensor 1404 is supplemented using an image captured by the camera as shown (b) in FIG. 6 (S60).

The camera 1406 may capture the 2-dimensional image. That is, information of capturing a status of the location acquired by the sensor 1404 may be acquired.

In one example, when the camera 1406 is an RGB camera, and when the singularities are in the same color in S60, disconnected portions having the singularities interposed therebetween may be connected to each other and be determined as the same object. That is, even though the information in which there are the disconnected portions having the singularities interposed therebetween as shown in (a) in FIG. 6 is transmitted, when it is determined that two disconnected portions and a singularity interposed therebetween are in the same color, the disconnected portions may be supplemented as a single object as shown in (b) in FIG. 6. The RGB camera acquires information about a color of the object from the camera. An error in which, even though the disconnected portions are the single object in the same color, the disconnected portions are determined as a plurality of objects by the sensor 1404 or are not determined as the object may be prevented.

In one example, when the camera 1406 is an IR camera, and when the singularities have the same brightness in S60, the disconnected portions having the singularities interposed therebetween may be connected to each other and be determined as the same object. That is, even though the information in which there are the disconnected portions having the singularities interposed therebetween as shown in (a) in FIG. 6 is transmitted, when it is determined that the two disconnected portions and the singularity interposed therebetween have the same brightness, the disconnected portions may be supplemented as a single object as shown in (b) in FIG. 6. The IR camera acquires information about a shape of the object. In this connection, an error in which, even though the disconnected portions may be the single object based on the information acquired from the IR camera, the disconnected portions are determined as a plurality of objects by the sensor 1404 or are not determined as the object may be prevented.

That is, in the present embodiment, information about the obstacle and the like is determined based on the information acquired from the sensor 1404. When the information about the singularity at which the distance values are discontinuous is generated, the determination of the obstacle may be supplemented by the camera 1406 that acquires the two-dimensional information.

In one example, when the determination of the obstacle is supplemented by the information acquired by the camera 1406, whether the corresponding object is the obstacle is determined (S70). In the image acquired by the camera 1406, the plurality of singularities may also exist identically or there is no object in the corresponding portion. Therefore, even when the information acquired by the camera 1406 is considered, it may be concluded that there are two cases: the case in which the obstacle exists and the case in which the obstacle does not exist.

When determining that the object is the obstacle, the controller 1800 may use the machine learning technology to determine whether the corresponding obstacle should be avoided or whether the corresponding obstacle is able to be simply passed.

In one example, in a case of a usual obstacle, the driver 1300 may be driven such that the robot cleaner travels while avoiding the obstacle so as not to collide with the obstacle.

When the object is not determined as the obstacle in S70, a travel direction of the robot cleaner may be set such that the robot cleaner passes the object.

FIG. 7 is a view comparing images of a sensor and a camera captured a rod.

In the same process as in FIG. 6, the robot cleaner may accurately determine whether there is an object, such as a rod, having a small thickness compared to a length thereof in FIG. 7.

(a) in FIG. 7 is a screen in which information acquired by the sensor 1404 is image-processed by the controller 1800 to contain the distance value. in addition, (b) in FIG. 7 is a screen captured by the camera. In this connection, the camera 1406 is the two-dimensional camera, which may include the RGB camera or the IR camera.

In general, it is difficult to recognize the object such as the wire, the rod, or the like that having the small thickness compared to the length thereof as the obstacle by the depth image. This is because various noises and errors may occur in the process in which the image sensed by the sensor is image-processed to contain the distance value. Therefore, the present embodiment provides a technology capable of improving a degree of recognition of the obstacle using the two-dimensional camera image in order to reduce the error of determining that the obstacle does not exist even though the obstacle exists.

The present disclosure may not be limited to the embodiment described above. As may be seen from the appended claims, the present disclosure may be modified by a person having ordinary knowledge in the field to which the present disclosure belongs, and such modification may belong to the scope of disclosure.

The invention claimed is:

1. A method for controlling a robot cleaner, the method comprising: acquiring, by a camera, an image; irradiating, by a light source, light toward a location the same as a location where the acquired image is captured; receiving, by a sensor, the light irradiated from the light source and reflected on an object; processing an image received from the sensor to contain a distance value of an individual location; and supplementing the image received from the sensor with the image captured by the camera to form a single object when a singularity is found, wherein distance values calculated in adjacent portions are discontinuous at the singularity, wherein the adjacent portions means portions that are arranged for the distance values to form the single object, wherein in case that the image captured by the sensor is an image captured from farther than a particular distance, a distance between the adjacent portions is set to at least one first value, and in case that the captured image is an image captured from closer than the particular distance, the distance between the adjacent portions is set to at least one second value that are relatively greater than the at least one first value, wherein the supplementing of the image received from the sensor with the image captured by the camera includes determining whether an obstacle is at a portion where the singularity exists, and the robot cleaner travels while avoiding the obstacle, and wherein the obstacle has less than a particular thickness.

2. The method of claim 1, wherein the camera captures a 2-dimensional image.

3. The method of claim 2, wherein the camera is an RGB camera.

4. The method of claim 3, wherein the supplementing of the image received from the sensor with the image captured by the camera includes:
connecting disconnected portions having the singularity interposed therebetween with each other and determining the disconnected portions as the single object when the disconnected portions are in a same color.

5. The method of claim 1, wherein the camera is an IR camera.

6. The method of claim 5, wherein the supplementing of the image received from the sensor with the image captured by the camera includes:
connecting disconnected portions having the singularity interposed therebetween with each other and determining the disconnected portions as the single object when the disconnected portions have a same brightness.

7. The method of claim 1, wherein the supplementing of the image received from the sensor with the image captured by the camera includes:
determining that there is the obstacle at the portion where the singularity exists when disconnected portions having the singularity interposed therebetween are connected to each other.

8. A robot cleaner comprising: a camera for acquiring an image; a light source for irradiating light toward a location the same as a location where the acquired image is captured; a sensor for sensing that the light irradiated from the light source is reflected; a motor that applies a force to move the robot cleaner; and a controller configured to process an image using the light sensed by the sensor to calculate a distance value of an individual location in the corresponding image and to control the motor based on processing the image, wherein the image is supplemented with the image acquired by the camera to form a single object when a singularity is found, wherein distance values calculated in adjacent portions are discontinuous at the singularity, wherein the adjacent portions means portions that are arranged for the distance values to form the single object, wherein in case that the image captured by the sensor is an image captured from farther than a particular distance, a distance between the adjacent portions is set to at least one first value, and in case that the captured image is an image captured from closer than the particular distance, the distance between the adjacent portions is set to at least one second value that are relatively greater than the at least one first value, wherein the controller is configured to determine whether an obstacle is at a portion where the singularity exists, and the robot cleaner travels while avoiding the obstacle, and wherein the obstacle has less than a particular thickness.

9. The robot cleaner of claim 8, wherein the camera captures a 2-dimensional image.

10. The robot cleaner of claim 9, wherein the camera is an RGB camera.

11. The robot cleaner of claim 10, wherein the controller is configured to connect disconnected portions having the singularity interposed therebetween with each other and determine the disconnected portions as the single object when the disconnected portions are in a same color.

12. The robot cleaner of claim 8, wherein the camera is an IR camera.

13. The robot cleaner of claim 12, wherein the controller is configured to connect disconnected portions having the singularity interposed therebetween with each other and determine the disconnected portions as the single object when the disconnected portions have a same brightness.

14. The robot cleaner of claim 8, wherein the controller is configured to determine that there is the obstacle at the portion where the singularity exists when the image is supplemented such that disconnected portions having the singularity interposed therebetween are connected to each other.

* * * * *